June 4, 1929. R. C. ANGELL 1,715,975
SECURING DEVICE
Filed Oct. 9, 1925
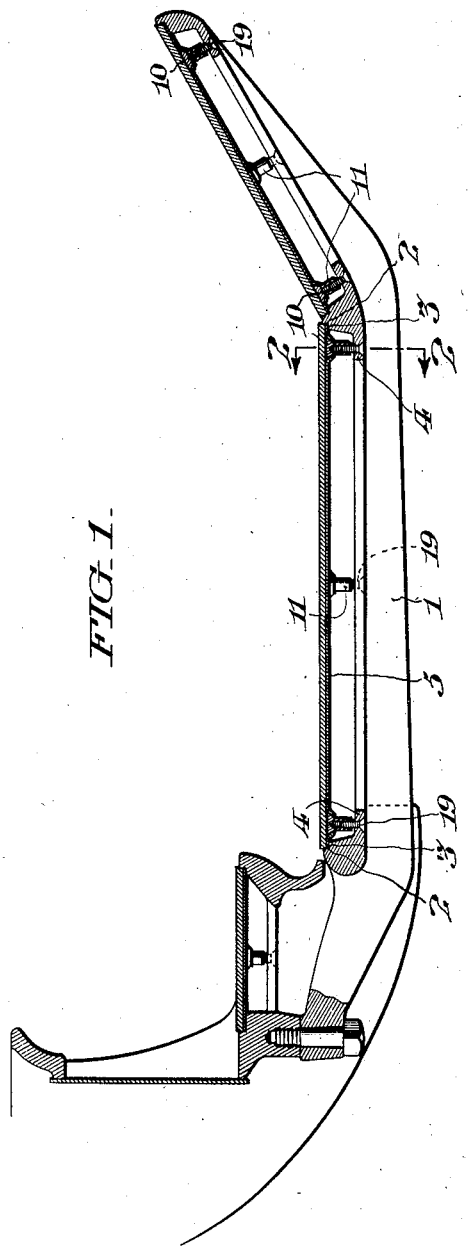
Inventor
Robert C. Angell,
By [signature] Hallowell
Attorney Patented June 4, 1929.

1,715,975

UNITED STATES PATENT OFFICE.

ROBERT C. ANGELL, OF PRINCE BAY, NEW YORK, ASSIGNOR TO THE S. S. WHITE DENTAL MANUFACTURING COMPANY, A CORPORATION OF PENNSYLVANIA.

SECURING DEVICE.

Application filed October 9, 1925. Serial No. 61,578.

My invention relates particularly to that class of securing devices that are arranged to afford an attachment between a cover plate or sheathing, and the structural framework by which it may be supported, and is especially directed to the means by which said securing device may be attached to the sheet material forming said cover plate or sheathing.

The principal objects of my invention are to provide a securing device that is inexpensive to manufacture, of simple and durable construction, and that may be employed to secure sheet material to its supporting structure in readily attachable and detachable relation.

Other objects of my invention are to provide a securing device so constructed and arranged that it may be so rigidly attached in interlocked relation to the sheet material as to in effect be integral therewith.

Further objects of my invention are to provide a securing device that may be so engaged with sheet material as to be substantially flush with the surface thereof and consequently afford a smooth uninterrupted plane surface free from any projecting encumberances.

Specifically stated, the form of my invention as hereinafter described comprehends a stud comprising a threaded, conically headed shank having notches disposed in the periphery of the conical head which is arranged to be embedded in a similarly shaped indentation in the sheet material to be secured, said shank being extended through an aperture therein, and arranged to receive a machine screw or nut of any convenient type to be so engaged therewith as to adjustably secure said sheet material to any suitable supporting structure.

My invention also includes all of the various novel features of construction and arrangement as hereinafter more definitely specified.

In the accompanying drawings, Figure 1 is a longitudinal sectional view of the footboard of a dental chair, showing a convenient embodiment of my invention applied hereto, Fig. 2 is an enlarged transverse sectional view taken on the line 2—2 in Fig. 1 showing the securing device in detail; Fig. 3 is a plan view of a fragment of the sheet material embodying the indentation into which the head of the stud is arranged to be received; Fig. 4 is a sectional view similar to Fig. 2 but taken in the plane indicated by the line 4—4 in Fig. 3; Fig. 5 is a perspective view of the stud per se; and Fig. 6 is a view similar to Fig. 2, but showing a slight modification of my invention.

In said figures the dental chair foot-board, comprises the supporting frame structure 1 having the perimetral groove 2 forming the ledge 3 and having the flange 4; the ledge 3 serving as a seat for the sheet metal plate 5 upon which the foot-board surfacing material such as linoleum, cork, rubber or other suitable substance may rest.

The plate 5 is provided at suitable regions with an aperture 6 surrounded by a plurality of indentations 7 pressed, punched or otherwise formed therein and generally conforming to a conical recess, concentric with said aperture, but having intermediate projections 9 extending in a plane with said plate and interrupting the continuity of such conical recess.

Said plate 5 is arranged to be secured to the frame structure 1 with its perimetral margin resting upon the ledge 3, by the stud 10 which is preferably in the form of a flat headed machine screw comprising the shank 11 and conical head 12, the peripheral edges of said head being provided with notches 13 into which the projections 9 extend when said shank 11 is extended through the aperture 6 and said head is disposed in the conical recess formed by the indentations 7.

In the form of my invention shown in Figs. 1, 2 and 4 the shank 11 is hollow and provided with internal treads 15 with which the threads 16 of an ordinary machine screw 17 may be engaged, with its shank 19 extended through a suitably provided aperture 20 in the flange 4 of the frame structure 1, and with the head of said machine screw 17 engaging a suitably provided countersunk recess 22 in said flange.

In the form of my invention shown in Fig. 6, the stud 25 has its shank exteriorly threaded and extended through a suitably provided aperture 26 in the flange 27, and arranged to be engaged by the nut 29 as indicated.

My invention is advantageous in that a plate of sheet material may be provided with projecting studs removably engaged therewith and so prevented from turning therein as to facilitate their engagement with a supporting structure, and said studs may be so attached to said sheet material as to afford a surface that is free from projections, thereby providing a convenient bed or base upon which a suitable covering may be laid.

Although I have shown and described my invention as applied to the foot-board of a dental chair, it is to be understood that it may be applied to any assembly where sheet material is to be engaged with a support, and therefore I do not desire to limit my invention to the precise details of construction and arrangement as herein set forth as it is obvious that various modifications may be made therein without departing from the essential features of my invention as defined in the appended claims.

Having thus described my invention, I claim:—

1. In a device of the class described, the combination with sheet material having an apertured portion forced inwardly to form a conical socket and a plurality of indentations radiating from said aperture, of a stud comprising a shank having a head notched to form a plurality of projections substantially conforming to said indentations and arranged to be seated therein, to prevent rotation of said shank when extended through said aperture.

2. In a device of the class described, the combination with a stud comprising a threaded shank having a flanged head provided with notches extended through its periphery affording a plurality of outwardly extended projections having intersecting walls extended in planes parallel with the axis of said shank, of a plate of sheet material having an apertured depression formed by a plurality of indentations complementary to said projections, which projections are arranged to be seated therein with said head substantially flush with the surface of said sheet material and the shank extended through said aperture.

3. In a device of the class described, the combination with a stud comprising a threaded shank having a conical head provided with notches in its peripheral edge forming wings, of a plate of sheet material having an apertured portion forced inwardly out of its plane to form a plurality of indentations complementary to said wings, extending from said aperture and forming intermediate free edged projections the upper surfaces of which lie in the plane of the sheet material, substantially conforming to said notches, and so arranged that when said shank is extended through said aperture the wings will be disposed in said indentations and the projections will enter said notches and the free edges so engage the walls of said notches as to rigidly engage said shank with said sheet material, and form an uninterrupted plane surface.

4. A plate of sheet material having a depression provided with an aperture and a plurality of indentations sloping toward said aperture and forming inwardly directed free edged projections extending substantially in the plane of said plate, and having intersecting walls perpendicular to said plane.

5. A device of the class described, comprising a member of sheet material having a depression forced inwardly and cut to form alternate peripheral regions respectively comprising inclined surfaces sloping toward a central aperture, and opposed inwardly directed projections having free edges and extending in the plane of said sheet material.

6. The combination with a member of sheet material having a depression forced inwardly and cut to form alternate peripheral regions respectively comprising alternate inclined surfaces sloping toward a central aperture, and projections having free edges and extending inwardly in the plane of said sheet material, of a stud comprising a shank having a head provided with peripheral regions respectively comprising alternate inclined surfaces sloping toward said shank, and notches defined by walls parallel to the axis of the stud between the surfaces of said head so conforming to the surfaces of said depression as to afford a smooth uninterrupted surface.

In witness whereof, I have hereunto set my hand this 12th day of September, A. D. 1925.

ROBERT C. ANGELL.